Sept. 20, 1966  D. P. MORGAN ET AL  3,274,584
APPARATUS FOR REMOTE READING OF UTILITY METERS
Filed Aug. 29, 1963  2 Sheets-Sheet 2

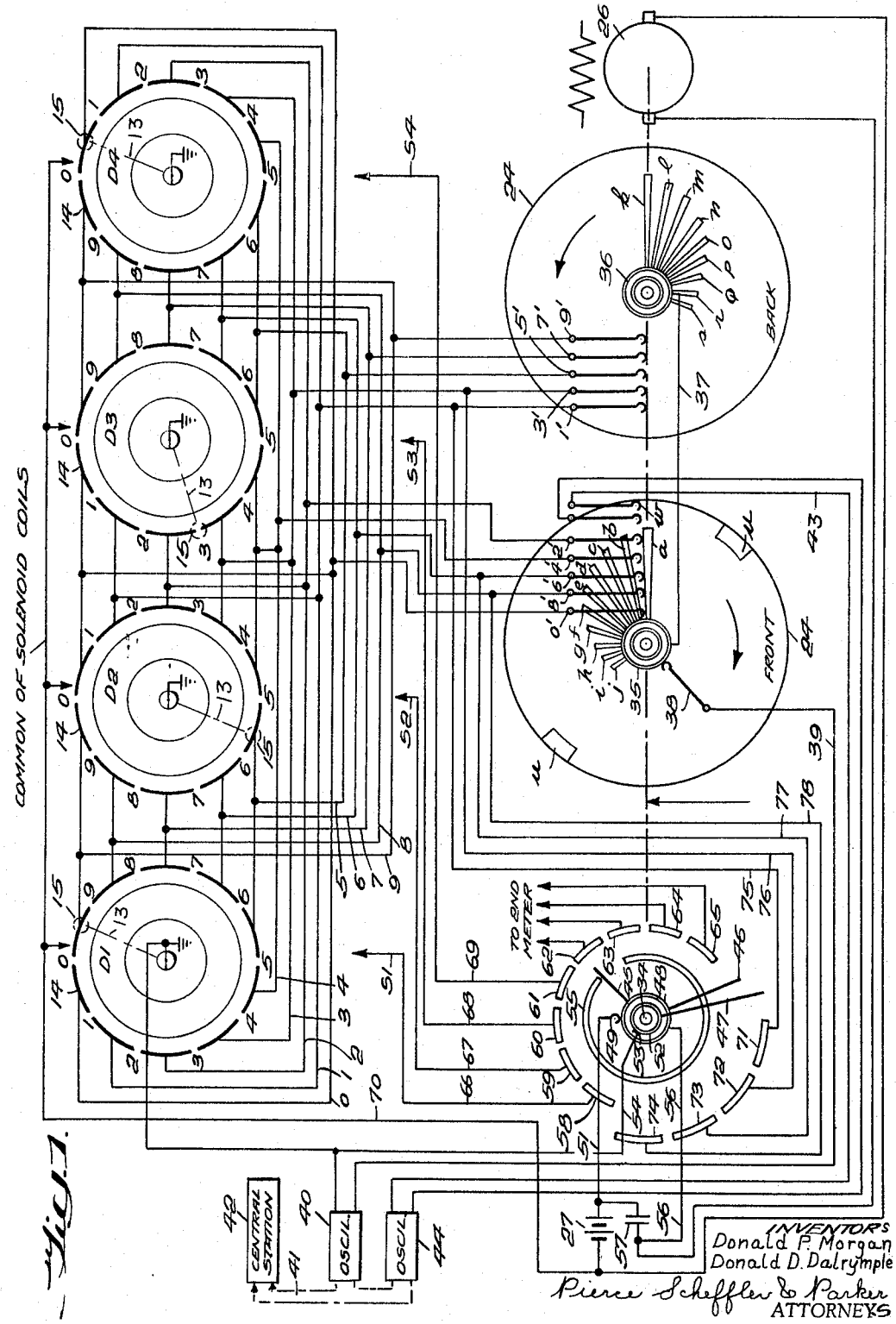

INVENTORS
Donald P. Morgan
Donald D. Dalrymple

BY Pierre, Scheffler & Parker
ATTORNEYS

United States Patent Office 3,274,584
Patented Sept. 20, 1966

3,274,584
APPARATUS FOR REMOTE READING OF
UTILITY METERS
Donald P. Morgan, Box 145, R.D. 1A, Russell, Pa., and
Donald D. Dalrymple, 6 Woods Road, North Warren,
Pa.
Filed Aug. 29, 1963, Ser. No. 305,380
14 Claims. (Cl. 340—347)

This invention relates in general to telemetering systems and more particularly to an improved apparatus for reading utility meters such as residential or commercial plant electric, gas or water meters from a central station as distinguished from the conventional practice of having the meters read directly at the meter location by personnel sent out by the utility company.

An object of the invention is to provide an improved arrangement which is comparatively simple in construction and can be made at relatively low cost for reading the several dials of one or more utility meters of the conventional, decimal integrating type and transmitting the meter readings together with the meter number back to a central station by way of code pulses for recording, billing and the like. These code pulses may be carried over existing telephone or power or other utility lines by means of generally conventional carrier technique.

Another object is to provide an improved meter reading apparatus which can be easily applied at relatively low cost by way of modification of the register assembly of existing utility meters thus making it unnecessary to replace these meters with specially constructed meters when changing over from personal to automatic central station reading in accordance with the invention.

Still another object of the invention is to provide a remote meter reading apparatus without adding any friction load, which includes a special reading head that can be attached to existing meters in substitution for the existing reading head or register, the special head including rotary contact arms which can be easily attached to the existing drive shafts for the various pointer elements of the meter register. These contact arms are arranged for cooperation with special dials having contact segments thereon representative of different positions of the contact arms about the axis of rotation to establish corresponding code pulsing circuits through a rotary code pulse disc assembly and by means of which correspondingly coded pulses representative of the respective positions of the several contact arms are transmitted in succession to a central station for purposes of recording.

A somewhat similar arrangement is disclosed in our prior patent application Serial No. 119,250, filed May 22, 1961, now Patent No. 3,104,382, but the code pulse assembly comprises a plurality of rotary discs each carrying a different number of contacts which effect engagement with a stationary contact to establish a corresponding number of pulses. The present application makes it possible to simplify the prior construction by utilizing a single rotary disc and associated stationary contact members.

Preferably, operation of the rotary code pulse assembly is such that if the contact arm for any decimal register of the meter lies close to or directly upon the division line between two adjacent numeral values of that register thus ordinarily making it difficult to read accurately the position of that arm, a pulse series corresponding to each of the adjacent numerical values will be transmitted to the receiving station instead of the usual single series, and discriminating components in the computer located at the receiving station are enabled to distinguish between the dual and single pulse series and refer back to the pulse series for the next lower order decimal register to determine the correct reading of the particular decimal register whose reading is in doubt.

The foregoing as well as other objects and advantages of the invention will become more apparent from the following detailed description of a preferred embodiment in conjunction with the accompanying drawings wherein:

FIG. 1 is an electrical schematic view showing the meter reading system in general;

Figure 3:
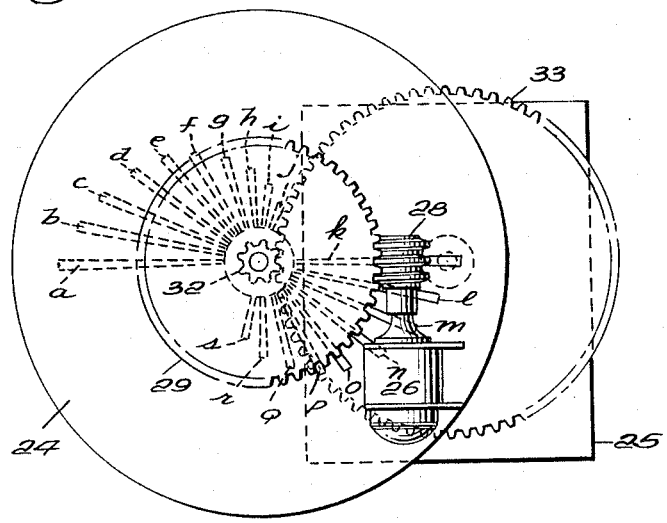
FIG. 3 is a view in elevation showing the general structural arrangement of the code pulse producing assembly.

In accordance with the invention, existing meters of the decimal integrating type may be modified to substitute for the existing register and pointer elements, a face plate 11 having disposed thereon a plurality of indicator dial areas which may be identical in size and location as those on the existing meter register. In the illustrated embodiment, four dial areas are shown and these have been designated D1, D2, D3 and D4 so as to correspond with the four decimal registers usually employed in a utility meter. The existing pointer elements on the corresponding drive shafts 12 are replaced with special contact pointer elements 13 which are adapted to rotate about the dial faces. Each dial face is divided into ten arcuately configurated, electrically conductive contact segments 14 representing the numerical values or digits 0 through 9, and each segment is electrically insulated from the adjacent segments at the points of division by establishing a small spacing therebetween. The contact segments 14 of the various dial areas may be conveniently established by utilizing the well known printed circuit technique, the face plate 11 thus being made up as a printed circuit board. Each contact pointer element 13 is provided with a single contact element in the form of a helical spring 15 which is adapted to engage the ring of contact segments 14 only when that particular decimal register dial is to be read. It will be noted from FIG. 1 that each helical spring contact 15 is so dimensioned as to bridge and make contact with the end portions of adjacent segments 14 whenever the contact pointer 13 occupies a position which corresponds to the division line between adjacent segments. The purpose of this will be explained later.

Figure 2:
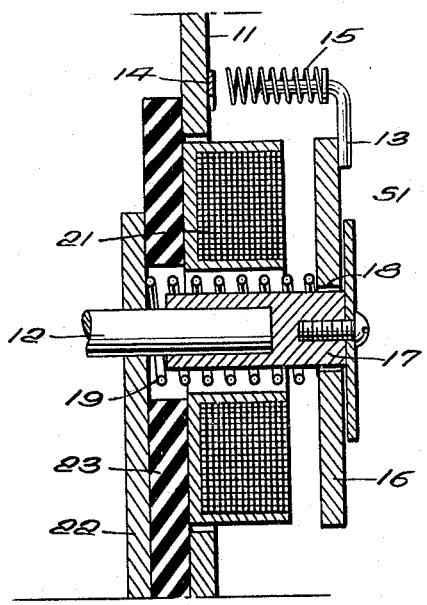
FIG. 2 is a central section through one of the decimal register shafts of the meter head showing in section the various components correlated therewith in accordance with the invention for "reading" the rotary position of the shaft.

For actuating the several contact pointers 13, it will be seen from FIG. 2 that each one is secured upon an armature disc 16 which in turn is slidably but non-rotatably mounted upon a rectangular shaft 17 secured to one of the meter register drive shafts 12. For this purpose, each armature disc 16 is provided with a rectangularly configured central opening 18 which corresponds generally to the size and configuration of shaft 17, such construction enabling armature 16 to slide longitudinally along shaft 17 and also be driven in rotation by the same as the meter shaft 12 and shaft 17 rotate together.

A helical spring 19 surrounds shaft 17 and normally serves to maintain armature disc 16 and hence, also the contact pointer 13 in such a position that contact spring 15 does not engage any of the contact segments 14. However, when a particular decimal register is desired to be read, the armature disc 16 is pulled in by energizing the coil of an annular solenoid which surrounds shaft 17. Each solenoid, these being designated S1 to S4 to correspond with dials D1 to D4, is mounted within a suitable opening in the printed circuit board 11, being secured to the meter register frame 22 with an insulating spacer 23 therebetween.

Figure 4:
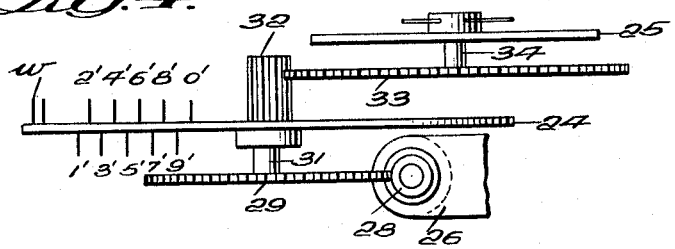
FIG. 4 is a top plan view of the assembly as shown in FIG. 3.

In addition to the special printed circuit board 11 with its dials D1 to D4 and solenoid actuated contact pointers 13 for the dial segments 14, the read-off device for each meter in accordance with the invention includes a code pulse producing assembly as shown in FIGS. 3 and 4 which is composed essentially of two main components. One such component is rotatably mounted disc 24 with two sets of contact strips located respectively on opposite faces of the disc, and related sets of contact fingers from which are produced various pulse codes indicative of the respective positions of the contact pointers 13. The other main component is a stationary plate 25 with a suitable arrangement of contact segments and rotary contact arms which establish the program for obtaining a complete reading operation of the meter.

The pulse code disc 24 and the various rotary contact arms of the program plate 25 are driven by a small electric motor 26 which can be powered by any suitable source such as the battery 27 illustrated as an example in the drawing. The particular drive illustrated in the drawing includes a worm 28 on the drive shaft of motor 26, the worm 28 being meshed with a worm gear 29 secured upon a shaft 31 on which is also mounted the pulse code disc 24. Shaft 31 also includes a small pinion gear 32 thereon which meshes with a much larger gear 33 secured upon another shaft 34 to which the rotary contact arms of the program device are likewise secured. Thus, when motor 26 is energized it rotates the pulse code disc 24 and pinion 32 which serves to drive the larger gear 33 and rotary contact arms of the program device at a reduced speed.

The gear ratios in the driving train are so chosen that the pulse code disc 24 makes thirteen revolutions for each revolution of the contact arms of the program device and the drive to the motor is such that for each complete reading operation of the meter or meters which may be included, the contact arms of the program device make one complete revolution. The purpose of this will become clearer in a latter part of description explaining the details of operation.

The pulse code disc 24 made of electrically insulating material is provided with two sets of rectilinear contact strips located respectively on opposite faces of the disc. As seen in the circuit diagram of FIG. 1 which pictures both the front and rear faces of the disc, the first set of ten contact strips, which may be applied to the disc by the printed circuit technique, are lettered *a* through *j* and are all connected to a contact ring 35. These contact strips all extend radially with respect to the disc center which coincides with the axis of rotation of shaft 31 but are of progressively longer length, the strip *j* being shortest and strip *a* being the longest. Associated with these contact strips is a row of parallel spaced upright contact fingers 2', 4', 6', 8' and 0'. The second set of nine contact strips applied to the opposite face of disc 24 and connected to contact ring 36 are lettered *k* through *s* and these are arranged in the same manner as the first set of strips but phase displaced by 180°. Associated with the second set of contact strips *k–s* is a second row of parallel spaced upright contact fingers 1', 3', 5', 7' and 9'. Contact rings 35 and 36 are electrically interconnected by conductor 37 and a brush arm 38 is associated with one of these rings such as ring 35 so as to provide a pulse take off which feeds over line 39 to control a corresponding pulsed operation of oscillator 40, the oscillator output being fed over lines 41 to the central station 42 where the receiver, computing and billing components, not illustrated but which are all known, are located.

In order that the proper pulse code may be transmitted for each of the ten possible positions of each of the four contact pointers 13 of dials D1 to D4, it will be noted from the circuit diagram of FIG. 1 that all like numbered contact segments 14 of the four dials are electrically interconnected to each other and also to the corresponding numbered contact finger (0' to 9') associated with the contact strips *a–j* and *k–s*.

Due to the progressive differences in length of the contact strips *a–j* and *k–s* and the different positions of the contact fingers 0' to 9' radially from the center of the disc 24, as the disc rotates each numbered contact finger will engage in succession the same number of contact strips as its number resulting in transmission of the same number of pulses. Thus, contact finger 1' will engage only contact strip *k*, contact finger 5' will engage five contact strips *k* to *o*, and contact finger 8' will engage eight contact strips *a* to *h*, etc.

Also associated with one face of the pulse code disc 24, the front face being selected, is a pair of 180° displaced contact segments *u, u'* which are adapted to bridge and establish connection between two other contact fingers *w* for the purpose of generating and transmitting a code pulse to signal the end of the transmission of each number and activate the counter read-out and reset, and card punch or similar recording device at the central station 42. Conductors 43 lead from contact fingers *w* for the purpose of controlling a pulsed operation of a second oscillator 44, the output of this oscillator also being fed over lines 41 to the central station 42 but at a different frequency so as to enable the receiving equipment at the central station to distinguish between the pulses produced by the respective oscillators.

The program device is comprised of the plate 25 of insulating material which is provided with three concentric contact arms 45, 46 and 47 all of which are secured upon shaft 34 and are rotated by the latter. Contact arms 45, 46 are electrically interconnected through a contact ring 48 which also rotates with shaft 34, and a stationary brush 49 arranged in sliding contact with ring 48 is connected to the positive terminal of battery 27 by way of conductor 51. Contact arm 47 is connected to another contact ring 52 which rotates with shaft 34, and a stationary brush 53 arranged in sliding contact with ring 52 is connected to a conductor 54 which leads to one terminal of oscillator 40 and also to all the rotary contact pointers 13 of the dials D1 to D4.

Associated with rotary contact arm 45 is a concentric arcuate contact strip 55 on plate 25 which is almost a complete circle, the distance between the ends of the strip being about one-thirteenth of its circumference. This contact strip is connected by conductor 56 to one terminal of motor 26 and also through the reading cycle initiating contacts of a relay 57 to one terminal of battery 27.

Associated with rotary contact arm 46 is a concentric arcuate set of contact segments 58–65. Contact segments 58 to 61 are connected respectively via conductors 66–69 to one terminal of each of the four coils 21 of solenoids S1 to S4. The other terminal of each of the four solenoid coils 21 is connected by conductor 70 to the other terminal of battery 27. Contact segments 62 to 65 are provided for connection respectively to the solenoid coils of a second meter, not illustrated, which is desired to be read. Thus, the invention makes it possible to read one, two or more meters installed in any home such as, for example, gas, electric and water meters.

Associated with rotary contact arm 47 is a concentric arcuate set of contact segments 71–74 which are connected respectively via conductors 75–78 to selected ones of the set of ten contact fingers which correspond to the four digit numerical number of the meter which is to be read.

OPERATION

The automatic meter reading apparatus in accordance with the invention operates in the following manner:

When one or more meters are desired to be read from a central recording station, a telephone call dialed from the station picks up the frequency sensitive relay contacts 57 at the meter location which closes an energizing circuit for motor 26 from the local source of power, illustrated by battery 27, thus initiating rotation of the pulse code disc 24 and contact arms 45–47 of the program device from their starting positions, these being the positions shown in FIG. 1. Relay contacts 57 are maintained closed for a short time until contact arm 45 engages contact strip 55 which establishes a paralleling holding circuit around the relay contacts to thus maintain the energizing circuit for the motor. Relay contacts 57 can then be allowed to drop out, the motor continuing to run. Disc 24 completes its first revolution.

Contact arm 47 then engages the contact segments 71 to 74 in succession, the contact arm remaining engaged with each segment for a complete revolution of the pulse code disc 24. During the time that arm 47 engages each contact segment, oscillator 40 will be caused to transmit a number of pulses corresponding to the numerical value of the corresponding digit of the meter number. In the wiring diagram illustrated in FIG. 1, contact segments 71 to 74 are connected respectively to contact fingers 1', 3', 6' and 8'. Thus, in the second revolution of disc 24, oscillator 40 will transmit one pulse, in the third revolution, three pulses, in the fourth revolution six pulses, and in the fifth revolution eight pulses. After this phase of the reading operation has been completed, contact arm 47 has no further function.

After each pulse or group of pulses representative of a digit of the four digit meter number has been transmitted to the central station, one of the contact segments $u$ is engaged by contact fingers $w$ to cause a code pulse to be transmitted to the central station over the second oscillator 44 which activates the ring type counter readout and card punch operation for that particular digit and resets the counter for receiving the next pulse or pulse group transmitted from oscillator 40.

The next phase of the reading operation is the reading of the digital meter dials D1 to D4 themselves. This is done for the single meter illustrated as contact arm 46 engages the contact segments 58 to 61 in succession, the contact arm remaining engaged with each segment for a complete revolution of the pulse code disc 24. During the time that arm 46 engages each contact segment, the magnet coil 21 of the corresponding solenoid S1 to S4 will be energized thus causing the solenoid armature 16 to pull in and effect engagement between the contact spring 15 and the particular contact segment of the dials D1 to D4 corresponding to the rotary position of contact pointer 13 which, of course, has the same rotary position as its corresponding digital meter head drive shaft 12.

In the example shown in FIG. 1, contact spring 15 for dial D1 is positioned on contact segment 9. Consequently, when solenoid S1 is energized a circuit will be completed from one terminal of the input to the oscillator 40 through contact pointer 13, spring contact 15, contact segment 9, and the conductor of the same number to contact finger 9'. Thus, when disc 24 makes the second half of its revolution, contact finger 9' will engage all of the contact strips $k$ to $s$ and the circuit from contact ring 36 back to the other input terminal of oscillator will be made momentarily for a total of nine times thus resulting in the transmission of nine pulses from the oscillator output over the lines 41 to the central station 42, where they are translated through the ring type counter into a numerical digit which is then recorded in the punch card or tape on which the meter number was recorded.

In a similar manner, contact spring 15 for dial D2 is positioned on contact segment 5 thus resulting in the transmission of five pulses from oscillator 40 during the next revolution of disc 24 as contact finger 5' engages only the contact strips $k$ to $o$.

Contact spring 15 for dial D3 is illustrated as being positioned between segments 2 and 3 thus making electrical contact with both segments and indicating that the corresponding dial pointer 13 would ordinarily be difficult to read. In such case, during the first half revolution of disc 24, the circuit will be completed through the even number segment two to contact finger 2' at the front side of the disc thus resulting in the transmission of two pulses from oscillator 40 as contact finger 2' engages only the contact strips $a$ and $b$. During the second half revolution of disc 24, the circuit will be completed through the odd number segment three to contact finger 3' at the back side of the disc thus resulting in the transmission of three pulses from oscillator 40 as contact finger 3' engages only the contact strips $k$, $l$ and $m$. Thus, for the third digit reading two sets of pulses will be transmitted to the central station and two punches will be made in the card or tape.

Contact spring 15 for dial D4 is illustrated as being positioned on segment 0. In such case during the next revolution of disc 24, ten pulses are transmitted from oscillator 40 as contact finger 0' engages the ten contact strips $a$ through $j$.

Thus, for each digit of the four place meter head, dials D1 to D4, either one or two punches will be made on a card at the receiving station. If two punches are made for a particular dial reading, computer apparatus can be employed at the station to refer to the reading for the next lower order dial. If the latter is zero to one, the proper reading for the double punched recording is the higher number. If the next lower order dial reads nine to zero, the proper reading for the double punched recording is the lower number. In the illustrated example, since dial D4 reads between zero and one, the proper reading for dial D3 is the higher number three.

After the first meter is read, the reading cycle will be repeated for the 2nd meter as program contact arm 46 successively engages contact segments 62 to 65.

After the reading of the 2nd meter has been completed, the contact arms of the program device will have completed one revolution from their starting positions which brings contact arm 45 to the end of contact strip 55. As soon as contact arm 45 breaks contact with the end of strip 55, the energizing circuit for motor 26 will be interrupted thus bringing the program device and the impulse code disc 24 to an immediate halt. This then completes the reading operation for the meters at this particular location. In a similar manner, the meters at other locations can be provided with like reading equipment so that all meters in a particular geographical area or town can be read automatically thus eliminating the costly procedure of having the meters read at the various locations by personnel of the utility company.

We claim:

1. Apparatus for telemetering to a remote location the relative positions of a plurality of rotary shafts of a meter register of the decimal integrating type, comprising a contact ring for and arranged concentric with each of said shafts, each such contact ring being constituted by ten contact segments insulated from each other, each said contact segment corresponding to a different digital indicating position for the associated rotary shaft, rotary contact arms for and cooperative with each of said contact rings, said contact arms being adapted for attachment to said meter register shafts so as to establish contact with the contact segments on said rings, and a code pulse assembly having different pulse producing means characteristic respectively of the differently positioned contact segments of each contact ring, said code pulse assembly being comprised of a support of insulating material having thereon a plurality of conductor strips, a plurality of contact members for said conductor strips, and means effecting relative movement between said conductor strips and contact members to effect engagement therebetween, said contact members being connected respectively to the different contact segments on said contact ring such that each contact member will engage the same number of conductor strips as corresponds to the digital indicating position of the rotary contact arm.

2. Apparatus as defined in claim 1 wherein said insulating support having the conductor strips thereon is arranged for rotation and said contact members are stationary.

3. Apparatus as defined in claim 1 wherein said insulating support is comprised of a disc of insulating material, the conductor strips on said disc being of progressively different length and extending outwardly from the central portion of the disc in substantially radial directions, and said contact members are arranged in a row at progressively different distances from the central portion of the disc for engagement with one or more of said conductor strips as relative rotation is effected between said disc and row of contact members about the disc center serving as the axis of rotation.

4. Apparatus as defined in claim 3 wherein said disc is mounted for rotation about its axis and said row of contact members is stationary.

5. Apparatus as defined in claim 3 wherein said plurality of conductor strips are arranged in two sets and a row of contact members is provided for each set such that engagement between said sets of conductor strips and the associated rows of contact members take place in succession as said disc and rows of contact members rotate relative to each other, the contact members of one row being connected to the even number segments of the contact ring and the contact members of the other row being connected to the odd number segments on the contact ring, and said rotary contact arm is arranged to engage adjacent segments on said contact ring whenever said arm is located substantially intermediate the segments.

6. Apparatus as defined in claim 5 wherein said sets of conductor strips are displaced 180° relative to each other whereby engagement between said sets of conductor strips and associated rows of contact members takes place in successive half revolutions of the rotary movement between said disc and contact members.

7. Apparatus as defined in claim 5 wherein said sets of conductor strips and associated rows of contact members are located at opposite faces of said disc.

8. Apparatus as defined in claim 5 wherein said sets of conductor strips and associated rows of contact members are located at opposite faces of said disc, said sets of conductor strips being displaced 180° relative to each other whereby engagement between said sets of conductor strips and associated rows of contact members takes place in successive half revolutions of the rotary movement between said disc and contact members.

9. Apparatus as defined in claim 1 wherein said rotary contact arms are normally maintained in spaced relation from said contact rings, and means for actuating each of said contact arms in succession into engagement with its associated contact ring comprising a solenoid individual to each contact arm and including a rotary armature to which said rotary contact arm is secured.

10. Apparatus as defined in claim 9 wherein each said solenoid is constituted by an annular electromagnet surrounding the associated meter register shaft and said armature member is constituted by a plate mounted upon a hollow shaft which surrounds and is secured to the meter register shaft so as to rotate therewith, said armature plate being movable longitudinally on said hollow shaft toward and away from said electromagnet but being non-rotatable relative to said hollow shaft.

11. Apparatus as defined in claim 10 and which further includes a helical spring surrounding said hollow shaft and bearing against said armature plate to maintain said armature plate in a position away from said electromagnet when the latter is not energized.

12. Apparatus for telemetering to a remote location the relative positions of a plurality of rotary shafts of a meter register of the decimal integrating type, comprising a contact ring for and arranged concentric with each of said shafts, each such contact ring being constituted by ten contact segments insulated from each other, each said contact segment corresponding to a different digital indicating position for the associated rotary shaft, a rotary contact arm for and cooperative with each of said contact rings, said contact arms being adapted for attachment to the meter shafts and being normally maintained in spaced relation from said contact rings, and means for actuating each of said contact arms into engagement with its associated contact ring comprising a solenoid individual to each contact arm and including a rotary armature to which said rotary contact arm is secured.

13. Apparatus as defined in claim 12 wherein each said solenoid is constituted by an annular electromagnet surrounding the associated meter register shaft and said armature member is constituted by a plate mounted upon a hollow shaft which surrounds and is secured to the meter register shaft so as to rotate therewith, said armature plate being movable longitudinally on said hollow shaft toward and away from said electromagnet but being non-rotatable relative to said hollow shaft.

14. Apparatus as defined in claim 13 and which further includes a helical spring surrounding said hollow shaft and bearing against said armature plate to maintain said armature plate in a position away from said electromagnet when the latter is not energized.

No references cited.

MAYNARD R. WILBUR, *Primary Examiner.*

W. J. KOPACZ, *Assistant Examiner.*